United States Patent [19]

Nava

[11] Patent Number: 4,471,174
[45] Date of Patent: Sep. 11, 1984

[54] SUPPORT FOR HELMETS IN GENERAL PROVIDED WITH MICROTELEPHONE

[76] Inventor: Pier L. Nava, Verderio Superiore, Como, Italy

[21] Appl. No.: 505,192

[22] Filed: Jun. 17, 1983

Related U.S. Application Data

[63] Continuation of Ser. No. 203,844, Nov. 4, 1980, abandoned.

[30] Foreign Application Priority Data

Nov. 16, 1979 [IT] Italy ................................ 27374 A/79

[51] Int. Cl.³ ............................ A42B 3/02; H04R 1/00
[52] U.S. Cl. ................................... 179/156 R; 2/422; 179/156 A
[58] Field of Search ...................... 179/156 R, 156 A; 2/2.1 A, 422

[56] References Cited

U.S. PATENT DOCUMENTS

| 3,943,572 | 3/1976 | Aileo | 179/156 R |
| 4,152,553 | 5/1979 | White | 179/156 R |

FOREIGN PATENT DOCUMENTS

| 2245881 | 3/1974 | Fed. Rep. of Germany | 179/156 R |
| 2547372 | 4/1977 | Fed. Rep. of Germany | 179/156 R |
| 56-10793 | 2/1981 | Japan | 179/156 R |
| 1143259 | 2/1969 | United Kingdom | 179/156 R |

Primary Examiner—Gene Z. Rubinson
Assistant Examiner—L. C. Schroeder
Attorney, Agent, or Firm—Ladas & Parry

[57] ABSTRACT

The support B, shown in FIG. 2, embodies an arched flexible plate 10, provided with suitably shaped extremities 12 which terminate with fins or bevelled edges 14 apt to engage with seats on the inside of helmet A between shell A1 and extremity A4 of padding A3 of said helmet. Plate 10 is shaped, at least in part, as a box, to house, in the corresponding positions, a microphone M and earphones T, connected to each other and to a battery C—amplifier D group. Connection with other supports or with radio transceivers is obtained via connectors G.

1 Claim, 6 Drawing Figures

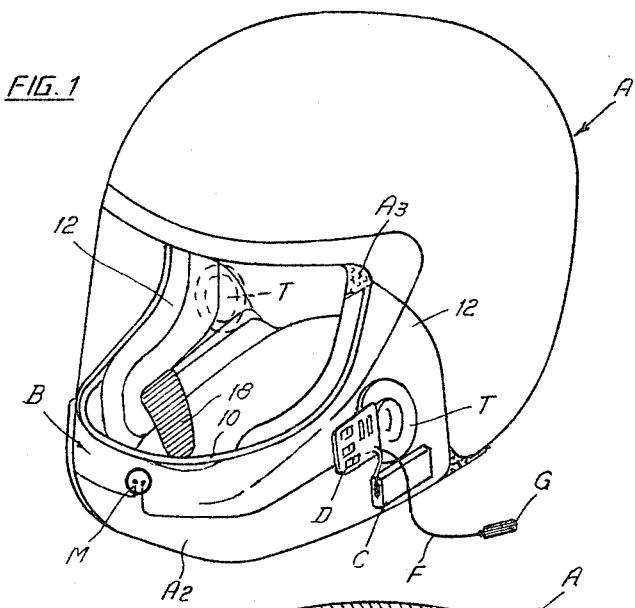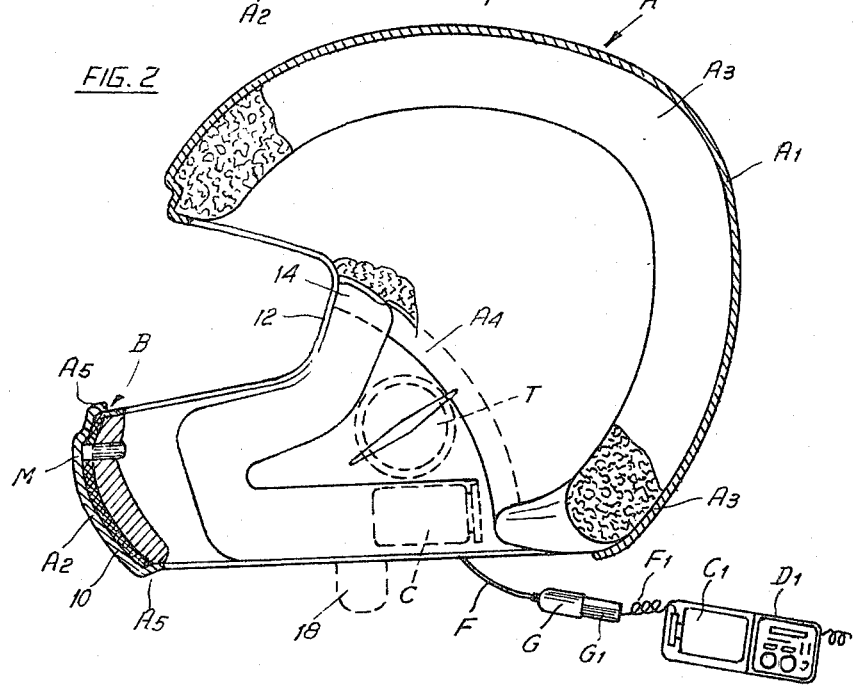

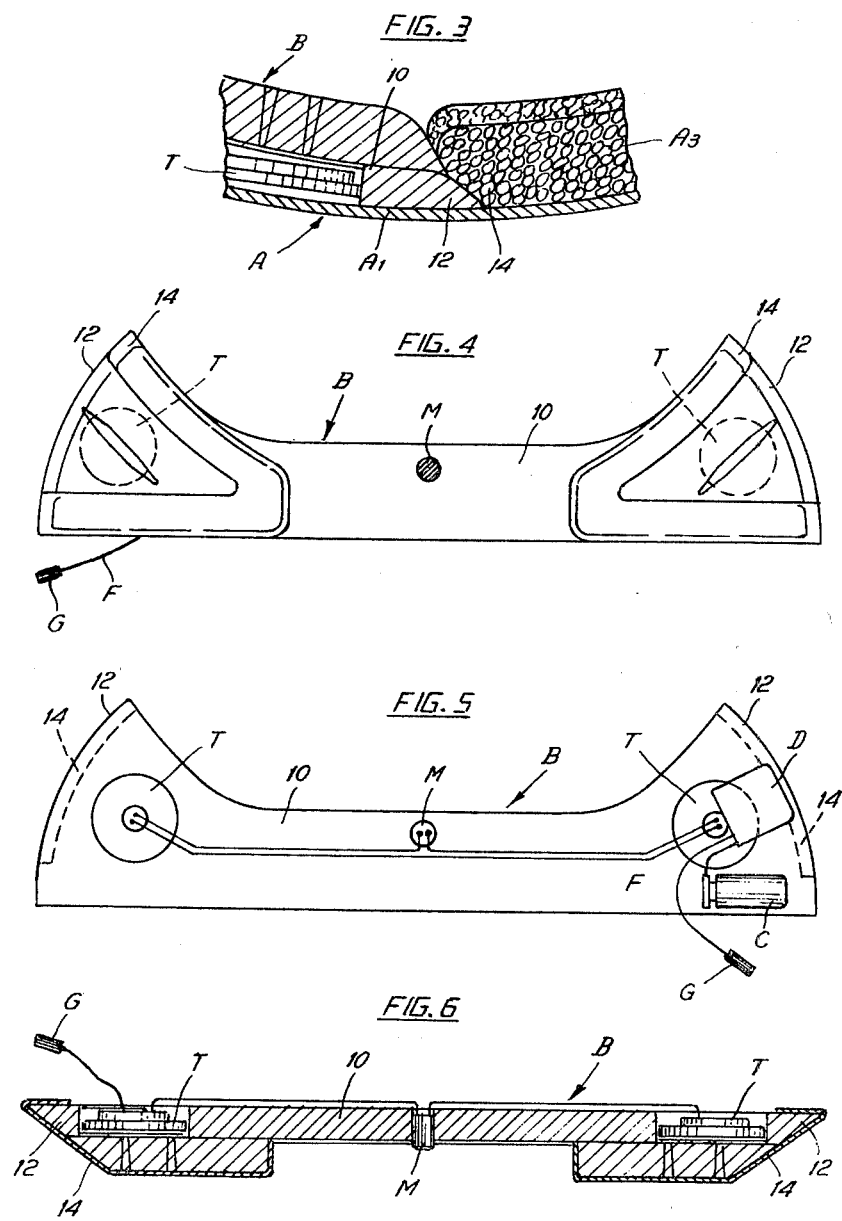

SUPPORT FOR HELMETS IN GENERAL PROVIDED WITH MICROTELEPHONE

This is a continuation of co-pending application Ser. No. 203,844 filed Nov. 4, 1980, now abandoned.

DESCRIPTION

This invention relates to a support applicable to helmets in general, provided with a microtelephone set for direct communications between two or more users (intercommunication) or by radio linkage and similar means.

The protective helmets used in industry and sport, because of their inherent structure, do not allow reception of sounds in general, and this is a considerable drawback for the users. In certain applications, two or more users must be able to communicate with one another, for example two users on a motorcycle or in a racing car, or persons working in mines, tunnels, etc.

The scope of the invention is to provide a support which may be applied removably to helmets, embodying a microphone, a phonic receiver or earphone and an amplifier with the relative battery, as well as means to connect electrically and/or inductively said parts with one another, to thus enable the two or more users to communicate with one another, without limitation and without need for laborious operations which, in certain cases, for example when driving a vehicle, cannot be performed without disturbing the manoeuvres of the driver.

Another object of the invention is to enable the user of the helmet to perceive sounds in general originating outside the helmet itself, for example, signals from a vehicle following that of the user.

A further object of the invention, in addition to that of providing a support applicable to helmets to enable two or more users to communicate with one another electro-acoustically, is to provide means of communicating with other users by radio, ensuring the maximum degree of manual freedom for said users, this provision being essential, as stated, in the case of vehicle drivers.

The support according to the invention, provided with a microphone and at least one earphone linked with an amplifier having relative power supply means, and held in alignment with the mouth and ears of the user, is characterized in that it has a plate of resiliently flexible material which may be folded over to form an arch, and the ends of which have removable connecting members apt to engage with the inner side walls of the helmet to position said microphone and earphones in the front lower position of the helmet, whilst said electrically interconnected components are provided with flexible coupling means to metallically and/or inductively connect them with one or more supports, to establish communication between two or more users.

In actual practice, the above concept is open to different practical embodiments, depending on the characteristics of the helmet to which the support is to be applied and also on the nature of the connection to be obtained between two or more users, for example, inductive or electromagnetic intercommunication when the support and/or helmet is provided with suitable antennae to communicate with other users within a certain radius, or by radio transceivers.

In one advantageous form of embodiment of the support, the flexible material plate is at least in part shaped as a box apt to house the components and its ends are shaped to form fixed joints apt to engage with the complementary parts on the inner walls of the helmet, at the height of the user's ears, so that the curved plate will form the chin rest of the helmet, if it is not provided withone, or a complementary chin piece, if the helmet is provided with one.

The invention will now be described in conjunction with the annexed drawings, which illustrate, by way of example, one preferred embodiment of the support according to the invention, applicable to standard type helmets.

In the drawings:

FIG. 1 is a perspective view of a helmet fitted with the support according to the invention.

FIG. 2 is a longitudinal cross section of the helmet according to FIG. 1.

FIG. 3 is a longitudinal cross section, on an enlarged scale, of the helmet according to FIG. 1.

FIG. 4 is a developed plane view of the support according to the invention.

FIG. 5 is a rear view.

FIG. 6 is a horizontal cross section.

In the drawings:

A indicates the helmet and B indicates the support according to the invention.

Helmet A embodies, in the known manner, a resistant structure or shell A1, conveniently shaped so as to provide on its front a cross member A2, constituting the chin piece and which delimits the bottom part of the helmet opening.

The interior of shell A1 is provided with padding A3 in resiliently flexible material, for example, rubber or expanded polyurethane, or other similar material, and with a suitable lining.

According to this invention, support B consists of a plate 10 of flexible material and —in relation to what will be stated hereinbelow which —is box-shaped at its extremities 12 and provided with shaped padding apt to conveniently fit the ears of the user. The center part of plate 10 has a width smaller than or substantially equal to that of chin piece A2, for the purposes to be described hereinafter.

The ends of support plate 10 terminate in appendices 12, shaped so as to form coupling means apt to engage removably with the complementary parts represented by front edges A4 of helmet padding A3. In order to ensure the connection between support B and helmet A, the ends of appendices 12 have, at their extremities, bevelled edges forming fins 14 which may be forcibly inserted in the relative grooves in front edges A4 of helmet padding A3 or formed between said edges and the internal walls of armature A1 of the helmet.

Supporting plate 10, as already stated, terminates with box shaped ends 12 apt to house and hold the electrical components such as telephone receivers or earphones T, an amplifier D and a supply battery C, while the mid part of the plate holds microphone M. These parts are arranged so as to be conveniently aligned with the ears and mouth of the user, while said parts, in particular battery C are accessible to the user for checking and replacement, by removing the cover of at least one of the boxes made up of ends 12 of plate 10.

The components referred to above are electrically connected to one another by terminals for a flexible conductor F leading to a connector G.

In relation to the practical applications of the support according to the invention, it is understood that any other apparatus may be applied with said support, by means of complementary connector G1, the flexible conductor F of which, connects with battery C and amplifier D (FIG. 1) housed in a suitable container, in case said parts are not secured and housed in support B. Obviously, flexible conductor F can be led to any other unit, for example, it may connect two users whose helmets are provided with supports B according to the invention and riding the same vehicle, such as a motorcycle, or for other uses to be described hereinafter.

Following the above, the removable link, joining support B to the structure of helmet A, is evident: it is enough to fold over support plate 10 to form an arch to bring the apertures of earphones T opposite to each other, insert the plate in the helmet opening to engage fins 14 is the grooves formed inside the helmet; between inner wall of shell A1 and front edge A4 of padding A3, said engagement is facilitated by providing a bevel on the edge of the ends of fins 14. Moreover, in order to secure and position support B to the front part of helmet A, the edges of chin piece A2 may be shaped or provided with gaskets forming projections A5, within shoulder of which, delimited by said projections, fits an elastic plate 10 to be retained by means of the engagement of its longitudinal edges. It follows that support B is securely held in helmet A, even when the user performs wide and quick movements which may cause considerable strain. Moreover, quick removal of support B from helmet A is always consented when the use of the latter demands and requires it, said removal being facilitated also because the rear part of support plate 10 is provided with tongues 18, apt to be grasped, by means of which fins 14 can be disengaged from the housings provided between shell A1 of the helmet and padding A3, also because the latter is somewhat flexible.

Because of the characteristic structure of plate 10 which holds the electrical components constituting support B according to the invention, it is possible to obtain helmets which, in addition to meeting the normal requirements of safety and comfort, also consent the establishment of phonic connections in duplex between two or more users provided with helmets having support B according to the invention. Specifically, it is possible to provide intercommunicating connections between the helmets of two users, the supports B of which are electrically linked to each other by flexible conductor F1 having, in addition to complementary connectors G1, also a switch which governs the inclusion of battery C into the power supply circuit. This is already considered in the case of two motorcyclists on the same vehicle who communicate with each other by duplex simply by actuating the switch key, fitted in a suitable position, in order to connect power supply battery C into the circuit.

It is also possible to establish communications between two users of the helmets which are a certain distance apart, by providing said helmets with appropriate antennae, each consisting of a certain number of coils, fitted, for example, at the edge which delimits one of the helmet apertures. The electromagnetic field produced by the coils of one of said antennae couples, via the coils of the other helmet, with support B of the latter, thus establishing communication between two or more users. This solution finds advantageous application in sports, foe example, for communication between racing car drivers, or also between workers in mines, tunnels and similar places.

Again support or supports B, according to the invention, may be connected, via connector G1 and relative cable F1, with a radio transceiver so that the user, besides being enabled to communicate with other users by means of flexible connectors F1, can also communicate with other users by radio. In this case, the radio transceivers may be conveniently located either on the vehicle itself or, advantageously, within the structure of the helmet A andthe relevant tuning and switching controls may be fitted to the outer wall of said helmet.

Lastly, the support according to the invention makes it possible to obviate the serious drawbacks, common to protective helmets in general, namely the impossibility for the user to receive or perceive sounds in general originating from outside the helmet. Typical are road accidents caused by the failure to perceive acoustic signals. As a result of this invention, said drawback is eliminated by support B, which contemplates a number of microphones M, some of which are fitted to the helmet to detect sounds originating from different directions. In this case the user can connect the required microphone M, via appropriate contact, depending of the direction of the sound.

It is obvious that modifications and/or changes may be introduced to the support of the invention depending on the structure of the helmet, in particular its padding. Under said aspect, this invention also extends protection to the helmet apt to hold the support removably according to the invention, in such manner that plate 10 of said support may form the chin piece of the helmet (if this is not provided with one) or constitutes a complementary or reinforcing part of the chin piece of the helmet itself. It is obvious that these and other changes still lie within the scope of the invention.

I claim:
1. A helmet support combination for securing a microtelephone assembly comprising:
 (a) the helmet having an outer shell;
 (b) a padding portion located inside of said portion, said padding portion having front edges;
 (c) groove means which is formed inside of said helmet between an inside surface of said shell and said front edges of the padding;
 (d) the support which is adapted to receive at least one microphone and at least one earphone, said support is carried out from a plate of flexible material having a configuration which allows a convenient adoption of a face of a user when said support is in a working position, said support having end portions shaped as to form means for removable engagement of said support with said front edges of the helmet padding is a such manner that said ends of the support are forcibly inserted with said groove means of the helmet;
 (e) suitably powered amplifiers which defines a circuit with said microphones and earphone;
 (f) coupling means adopted to connect electrically or inductively said circuit with one or more similar circuits; whereby in a working position of said support at least one microphone is located in a vicinity of a mouth and at least one earphone is located in a vicinity of ears of a user.

* * * * *